Nov. 28, 1950     H. A. GARRETT     2,531,976
RETRACTABLE LIFT ROTOR MECHANISM FOR AIRCRAFT
Filed Sept. 13, 1946     5 Sheets-Sheet 5
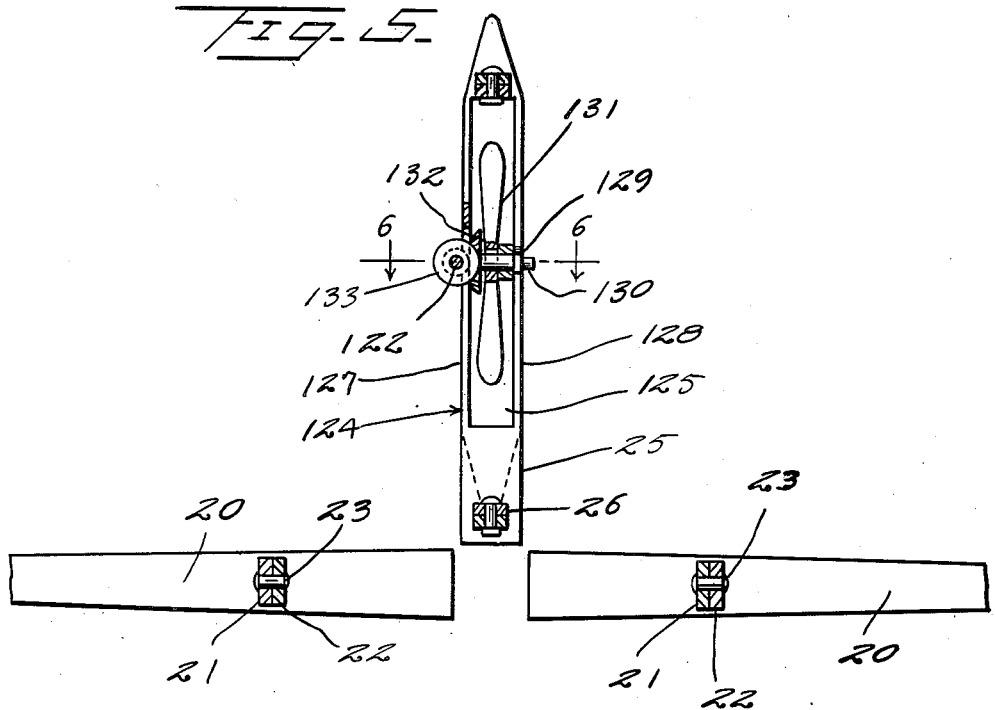
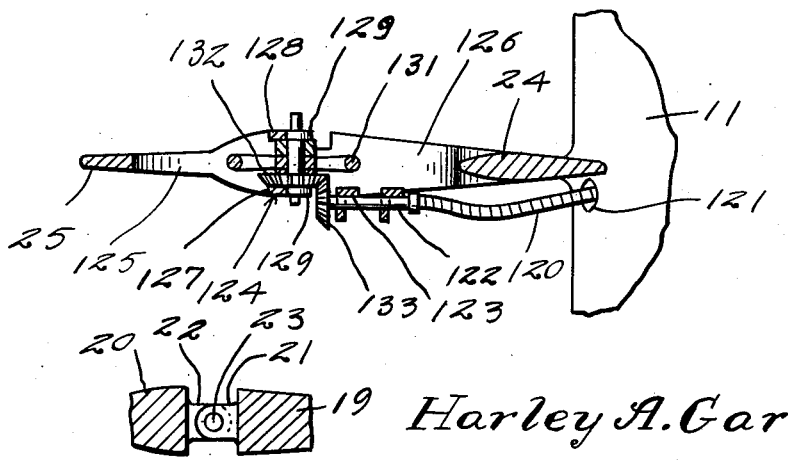
Inventor
*Harley A. Garrett*
By *Randolph & Beavers*
Attorneys Patented Nov. 28, 1950

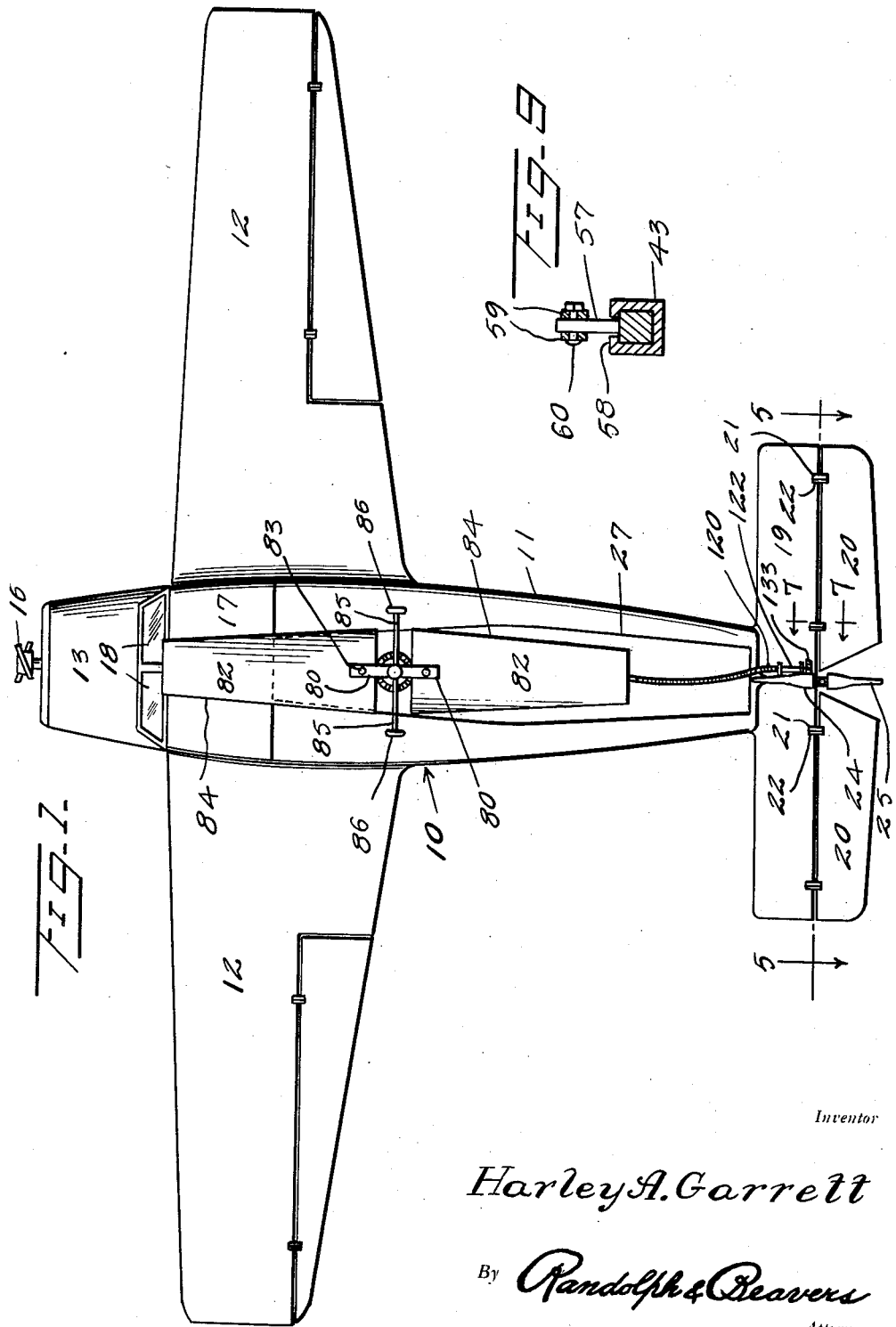

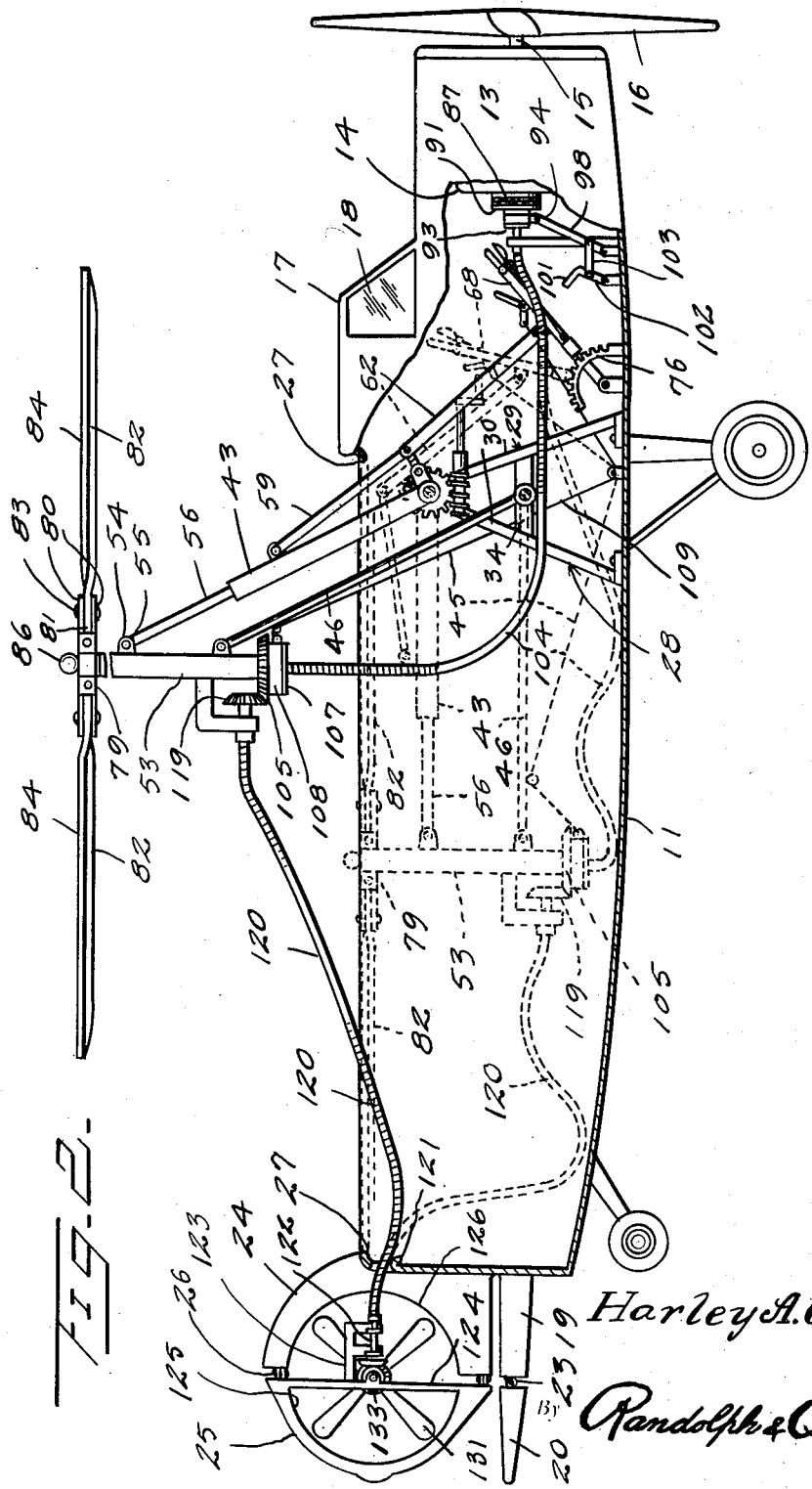

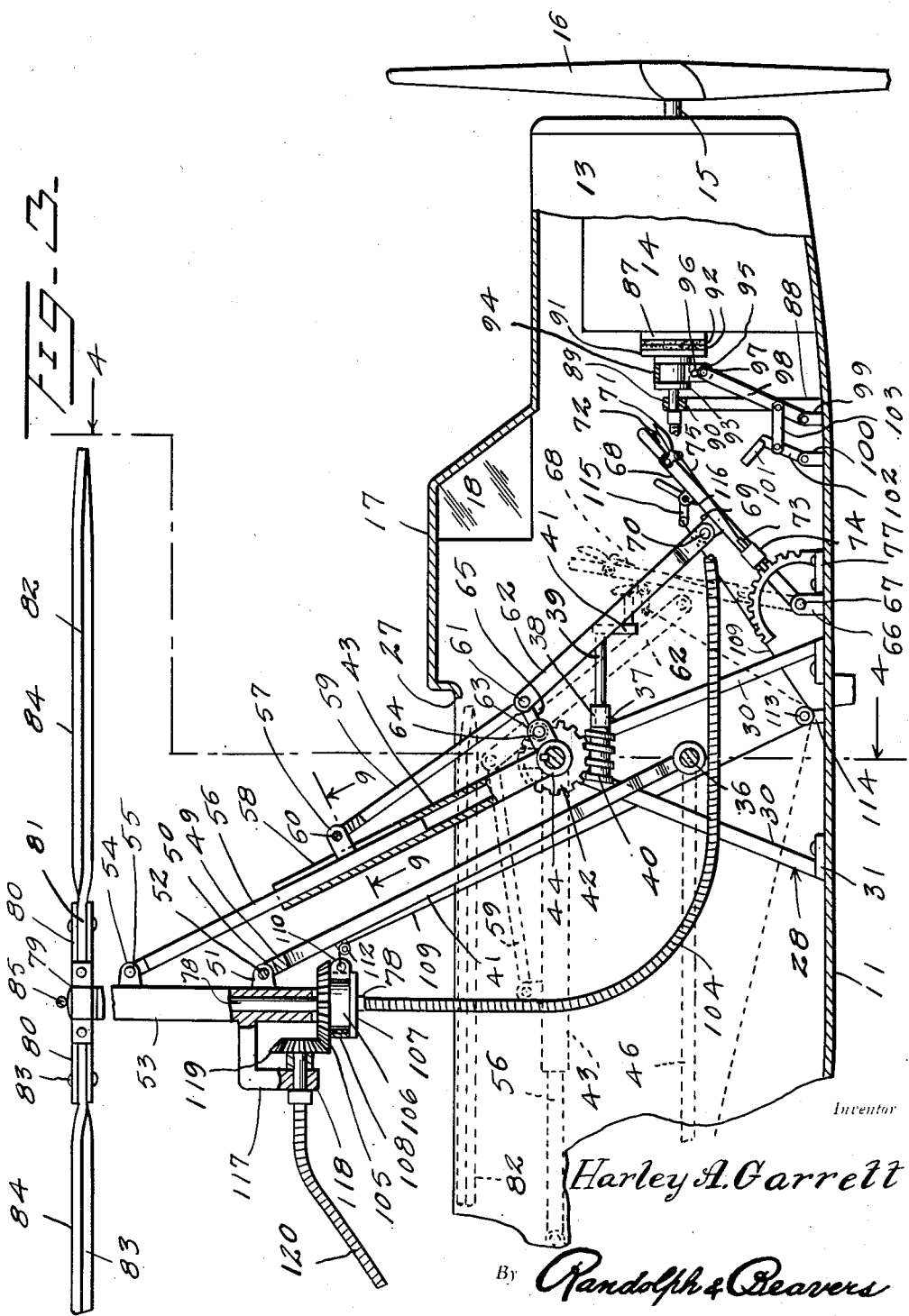

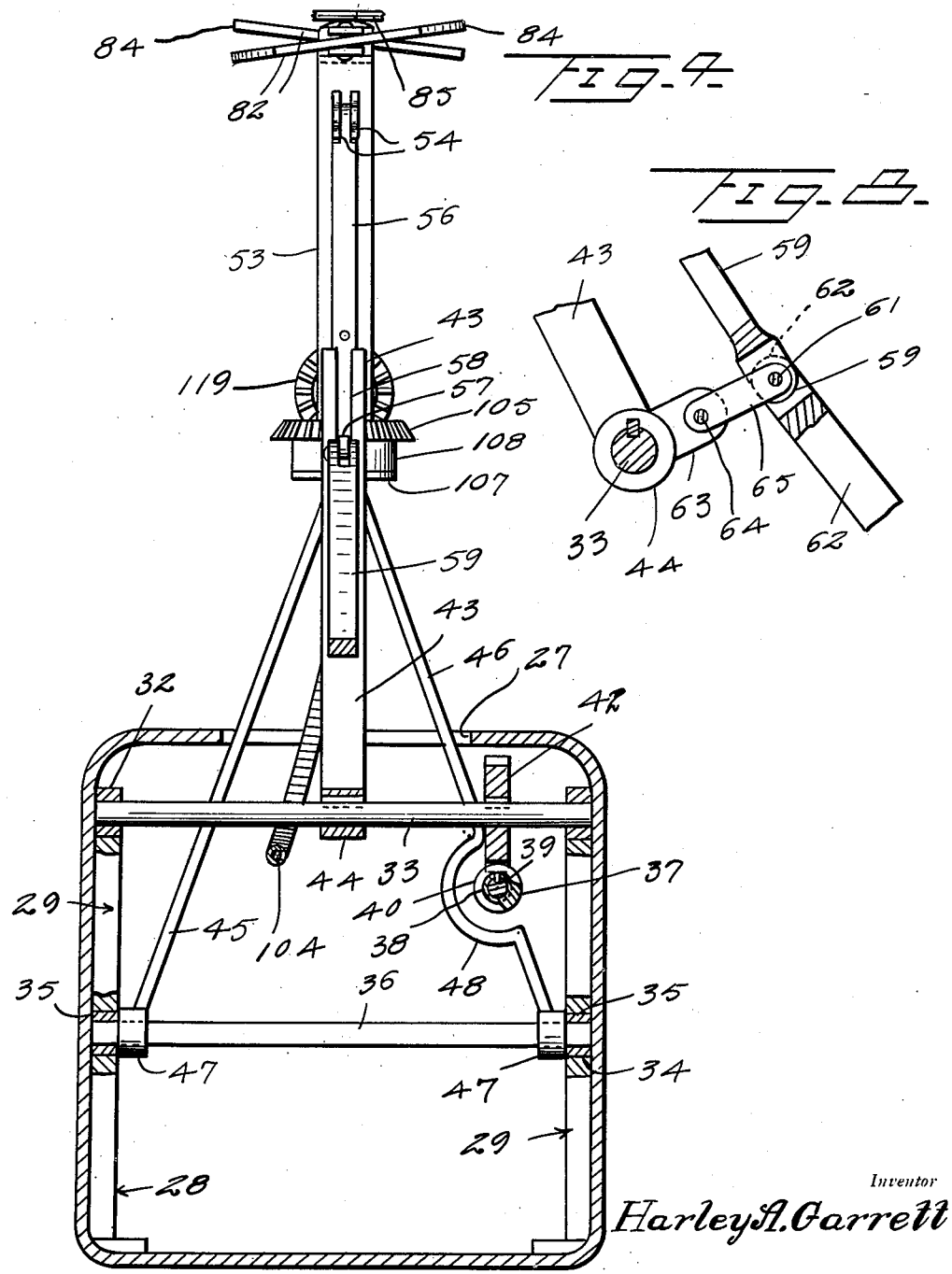

2,531,976

UNITED STATES PATENT OFFICE 2,531,976

RETRACTABLE LIFT ROTOR MECHANISM FOR AIRCRAFT

Harley Allen Garrett, Camden on Gauley, W. Va.

Application September 13, 1946, Serial No. 696,730

9 Claims. (Cl. 244—6)

This invention relates to improved construction of aircraft in which is combined the desirable features of airplanes, helicopters, gyrocopters and autogyros, in order to produce an aircraft which will be extremely safe to operate and which is capable of taking-off and landing on relatively small air strips, but which is also capable of obtaining speeds comparable to conventional aircraft.

More particularly, it is an object of the invention to provide an aircraft of the above described character having a horizontal rotor capable of being retracted into the fuselage of the plane, and which, when in an operative position above the fuselage, is capable of being driven to materially increase the lifting force exerted on the aircraft, and which accordingly is especially useful in landing and taking-off and rapidly acquiring altitude.

Still a further object of the invention is to provide an aircraft of the aforedescribed character and which is provided with a conventional supporting wing and propeller capable of being utilized in a conventional manner for supporting and propelling the aircraft in flight.

Still a further object of the invention is to provide an aircraft having a rudder and vertical fin, recessed to receive a torque control rotor and which is adapted to be actuated in conjunction with the horizontal rotor to compensate for the torque created by the horizontal rotor and to augment the rudder in effecting turning of the aircraft when the horizontal rotor is in operation.

Numerous other objects and advantages of the invention will hereinafter become more fully apparent from the following description of the drawings, illustrating a preferred embodiment thereof, and wherein:

Figure 1 is a top plan view of an aircraft constructed in accordance with the invention and showing the horizontal rotor in an operative position;

Figure 2 is a longitudinal, substantially central sectional view, partly in side elevation thereof;

Figure 3 is an enlarged fragmentary sectional view similar to Figure 2;

Figure 4 is a transverse vertical sectional view through the fuselage taken substantially along a plane as indicated by the line 4—4 of Figure 3;

Figure 5 is an enlarged transverse vertical sectional view taken substantially along a plane as indicated by the line 5—5 of Figure 1;

Figure 6 is a horizontal sectional view taken substantially along a plane as indicated by the line 6—6 of Figure 5;

Figure 7 is detailed sectional view taken substantially along a plane as indicated by the line 7—7 of Figure 1;

Figure 8 is an enlarged fragmentary view, partly in section and partly in side elevation, illustrating a portion of the mechanism for raising and lowering the horizontal rotor, and Figure 9 is an enlarged transverse sectional view taken substantially along a plane as indicated by the line 9—9 of Figure 3.

Referring more specifically to the drawings, the improved aircraft in its entirety is designated generally 10 and includes a longitudinally disposed fuselage 11 equipped with a conventional wing 12, the corresponding sections of which project from corresponding portions of the opposite sides of the fuselage 11. The fuselage 11 is provided in the nose 13 thereof with an engine 14 which drives a shaft 15, which projects forwardly from the nose 13 and to the forward end of which is keyed a conventional puller type propeller 16. The fuselage 11 is provided with a cabin 17 located behind and adjacent the nose 13 and the upper portion of which protrudes above said nose to provide a space for a transparent windshield 18 which is disposed to afford visibility to the front and sides above the nose and preferably forward of the wings 12. The aircraft 10 is provided with a fixed, horizontally disposed tail fin 19 which is positioned transversely of and at the rear end of the fuselage 11 and secured thereto. A pair of elevators 20 project rearwardly from the fin 19 and are pivotally connected thereto by means of corresponding lugs 21, 22 respectively, which project from the trailing edge of the fin 19 and from the leading edges of the elevators 20 and which are provided with apertured overlapping portions, pivotally connected by pivot pins 23, as best seen in Figure 7. The aircraft 10 is also provided with a fixed vertical fin 24 which is secured to and projects rearwardly from the tail end of the fuselage 11 and which is disposed above and substantially centrally of the fin 19. A vertically disposed rudder 25 is pivotally connected, adjacent its top and bottom ends and at its leading edge to the upper and lower portions of the trailing edge of the fin 24, by overlapping lugs and pivot pin arrangements 26, similar to the connections 21, 22 and 23, except that the connections 25 are disposed at right angles to the aforementioned, pivotal connections.

As best illustrated in Figure 1, the top portion of the fuselage 11 is provided with an elongated opening 27 in the top part thereof and which extends from adjacent the rear part of the cabin 17 to the rear or tail end of the fuselage. An upright bearing frame, designated generally 28, is mounted in the fuselage 11 behind and adjacent the cabin 17 and includes corresponding upright side members, each designated generally 29 and which are secured to corresponding portions of the sides of the fuselage 11. The upright members 29 each include a pair of upwardly converging legs 30 having angularly disposed feet 31 at their lower ends, which rest on and are secured to the bottom of the fuselage 11. The upper ends of each pair of legs 30 are joined by a bearing 32, and the bearings of the two uprights 29 are alined horizontally for journaling the ends of a shaft 33 which is disposed therebetween. The pairs of legs 30 are connected intermediate of their ends by an integral transverse brace 34 having a bearing 35, intermediate of the ends thereof, as best seen in Figure 4. The bearings 35 likewise are alined for journaling the ends of a shaft 36 which is disposed therebetween.

As seen in Figure 3, an arm 37 is secured to and projects inwardly from one of the legs 30, adjacent the upper end thereof and is provided with a bearing 38 at its free end which is disposed in substantially a horizontal plane and which forms a journal for a shaft 39 to one end of which is keyed a worm 40. A crank 41 is keyed to the opposite, forward end of the shaft 39 and is disposed in or adjacent the cabin 17. The worm 40 is disposed beneath the upper shaft 33 and meshes with a worm gear 42.

A tubular standard 43 is provided with a transverse sleeve 44 at its lower end which is keyed to the shaft 33, substantially intermediate of the ends thereof. A pair of brace members 45 and 46 are provided at their lower ends with corresponding, substantially transversely disposed sleeve portions 47 which engage the lower shaft 36, adjacent the bearings 35 and which may be fixed or turnably disposed thereon. The brace 46 differs from the brace 45 in that it is provided with an arcuate offset portion 48 to accommodate the worm 40. The braces 45 and 46 converge upwardly and rearwardly and are preferably joined at their upper ends by a cross bar 49 and are provided therebeyond with laterally spaced apertured ears 50 which straddle an apertured lug 51 and which are pivotally connected thereto by a pivot pin 52. The lug 51 is fixed to and projects laterally from an elongated sleeve-type bearing 53 which is provided with a second, outwardly projecting apertured lug 54, which is disposed above the lug 51 and pivotally connected at 55 to one end of a rod 56. The opposite end of the rod 56 is disposed in telescopic engagement with the tubular standard 43 and said end is provided with a laterally projecting apertured ear or lug 57 which slidably engages a longitudinally disposed slot 58 in the outer end portion of the tubular standard 43. A brace rod 59 is pivoted at 60 at its upper end to the lug 57 and is pivotally connected by a pivot pin 61 at its opposite, lower end to the upper end of a connecting rod 62. The sleeve 44 is provided with a radially projecting lug or ear 63 which is disposed substantially at a right angle to the standard 43 and which is pivotally connected at 64 to one end of a link 65. The opposite end of the link 65 pivotally engages the pivot pin 61.

A short standard 66 rises from the bottom of the fuselage 11 and in the cabin 17 and is pivotally connected at 67 at its upper end to one end of a lever 68 which extends upwardly therefrom and which is provided intermediate of its ends with a rearwardly projecting apertured ear 69 which is pivotally connected at 70 to the opposite, lower end of rod 62.

The lever 68 is provided with a handle at its upper end and has a handle lever 71 pivotally connected thereto and disposed adjacent the handle portion of the lever 68 and urged outwardly thereof by a spring 72. A pin or detent 73 is reciprocally disposed in a sleeve 74 on one side of the lever 68 and is connected by a link 75 to a lateral extension of the handle lever 71, so that when the handle 71 is moved toward the handle of the lever 68, the pin or detent 73 will be drawn upwardly, and conversely, will be moved downwardly when lever 71 is biased outwardly by spring 72. An arcuate toothed segment 76 is supported by a base 77 which is secured to the bottom of the fuselage 11 and is disposed at one side of and directly beneath the sleeve 74 and substantially concentric to the pivot 67, to receive the lower end of the detent 73 when the handle lever 71 is released, for latching the lever 68 in any of a plurality of adjusted positions to thereby retain the parts 59, 62, 43, 56, 53, 45 and 46 in any of a plurality of adjusted positions.

A shaft 78 is journaled in the sleeve bearing 53 and has a hub 79 keyed to the upper end thereof and disposed above the bearing 53. The hub 79 is provided with pairs of diametrically opposed ears 80 which project outwardly therefrom. The ears 80 are disposed in substantially vertically spaced apart relationship to provide, between each pair of ears, a substantially horizontally disposed, outwardly opening recess to receive the stem end 81 of a rotor blade or vane 82. The stem portions 81 are connected to the pairs of ears 80 by fastenings 83 which are disposed substantially vertically, and which combine with the recesses of the pairs of ears to permit a slight upward and downward movement of the vanes or wings 82 through an arc of approximately one-degree. The vanes 82 are adapted to revolve in a counter-clockwise direction as seen from above or as in Figure 1, so that the higher edges 84 thereof, constitute the leading edges of the rotor when in motion. As best seen in Figure 1, the hub is also provided with arms or rods 85 which project radially therefrom and substantially at right angles to the ears 80 and to the outer ends of which are secured weighted stabilizing elements 86 which tend to counterbalance the vanes 82 to minimize any tendency of the shaft 78 to oscillate relatively to its bearing 53.

A clutch element 87 is fixed to the opposite, rear end of the driven shaft 15, not shown, and is disposed rearwardly of the engine 14. A standard 88 extends upwardly from the bottom portion of the fuselage 11, adjacent the forward part of the cabin 17, and is provided in its upper end with a bearing 89 for journaling its substantially horizontally disposed shaft 90 to the forward end of which is keyed a clutch element 91. The clutch elements 87 and 91 are disposed substantially in alignment and are provided with suitable clutch faces 92 adapted to be detachably engaged for rotatably connecting the shaft 90 to the driven engine shaft 15. The shaft 90, between the clutch element 91 and bearing 89, is provided with a grooved collar 93 which is connected thereto in a manner to prevent sliding movement of the collar relatively to the shaft.

A sleeve 94 rotatably engages in the groove of the collar 93 and is provided with radially projecting lugs 95 which are longitudinally slotted at 96 to pivotally and slidably receive a pin 97. A lever 98 has its upper end disposed between the ears 95 and in engagement with the pin 97 for pivotally and slidably connecting the lever 98 to the sleeve 94. A pair of relatively short, upstanding standards 99 and 100 project upwardly from the bottom of the fuselage 11 behind and adjacent the standard 88 and the lower end of the rod or lever 98 is pivotally connected to the forward standard 99. A clutch pedal 101 is provided with a depending lever 102 which is pivotally connected to the rear standard 100. The clutch lever 102 is connected by a rigid link 103 to the lever 98; said link 103 being pivotally connected at its ends to the levers 98 and 102 and between the ends of said levers. It will thus be readily apparent, that a forward and downward pressure on the foot pedal 101 through the link 103 will cause both levers 98 and 102 to move forwardly on their lower pivots. The connection of the lever 98 to the collar 93 and shaft 90 will cause said shaft to slide forwardly in its bearing 89 to thereby move the clutch element 91 into operative engagement with the clutch element 87 for causing the shaft 90 to be revolved in unison with the shaft 15. The clutch element 91 may be manually retracted out of engagement with the clutch element 87 for disengaging the shafts, or suitable resilient means may be provided for accomplishing this result, if desired.

The shaft 90 projects rearwardly of the bearing 89 and is connected at its rear end to one end of a flexible shaft 104. The flexible shaft 104 extends beneath the shaft 36 and upwardly, from a point rearwardly thereof, and is connected at its opposite end to the lower end of the shaft 78, which protrudes below the lower end of the bearing 53. The lower, exposed end of the shaft 78 has a beveled gear 105, a brake drum 106 and a disk 107 keyed thereto and with the brake drum disposed between the gear and disk and beneath said gear. A brake shoe 108 of any suitable, conventional construction is supported around the drum 106 by the disk 107. The brake shoe 108 may be of any type capable of being contracted into applied position by a pull exerted thereon by a flexible cable, such as the flexible member 109 which has one end thereof fastened to a protruding lug or ear 110 of the brake shoe. The flexible member 109 is trained over a pulley 112 which is rotatably supported on the under or rear side of the leg 46 and said flexible member 109 extends downwardly therefrom and is trained under a guide pulley 113 which is journaled in standards 114 which rise from the lower part of the fuselage 11 and within the bearing frame 28. The opposite end of the flexible member 109 is fastened to one end of a lever 115 which is formed of legs which are obtusely disposed relatively to one another and which is pivotally connected at its apex to an ear 116 which projects from the upper or rear side of the lever 68. It will be readily apparent that when the other leg of the lever 115 is pressed toward the lever 68, as seen in Figure 3, that a pull will be exerted on the forward end of the flexible member 109 to apply the brake shoe 108 to the drum 106 to brake the rotation of the shaft 78 and the horizontal rotor, supported thereby.

The bearing 53 is provided with a rearwardly and downwardly extending supporting bracket 117 in the lower portion of which is journaled a shaft 118, to one end of which is keyed a bevel gear 119 which meshes with the bevel gear 105 and which is supported substantially at a right angle thereto. A flexible shaft 120 is fixed to and extends rearwardly from the opposite end of the shaft 118 and projects rearwardly through an opening 121 in the tail portion of the fuselage 11 and is connected at its opposite end to the forward end of shaft 122, which is journaled in substantially a horizontal plane by depending arms of a bearing 123. As seen in Figure 2, the bearing 123 is suitably fixed to a vertically disposed bar portion 124 which defines the leading edge of the rudder 25 and a portion of a substantially semicircular opening formed therein and designated 125. The vertical fin 24 is provided with a substantially semi-circular opening or recess 126 which opens rearwardly thereof and which combines with the opening 125 to form a substantially circular opening bisected by rudder bar portion 124.

As best seen in Figures 5 and 6, the bar portion 124 is formed of laterally spaced sections 127 and 128 having laterally projecting, aligned bearings 129 for journaling a shaft 130, to which a propeller 131 is keyed. The propeller 131 is disposed in the opening 125, 126 and between the brace sections 127 and 128 and a beveled gear 132 is also keyed to the shaft 130 and disposed between said brace sections. A bevel gear 133 is keyed to the rear end of the shaft 122 and meshes with the bevel gear 132 for driving the propeller 131 when the horizontal rotor vanes 82 are revolved. The blades of the propeller 131 are pitched so that said propeller will function to counteract the torque produced by the rotation of the rotor vanes 82 to thus function as a torque control rotor, and it will be noted that the propeller 131 is carried by the rudder 25 so as to rotate therewith on a vertical axis to thereby augment the action of the rudder 25 in turning the airplane 10 either to the right or left. It will be readily obvious that the torque control rotor 131 is revolved only when the vanes 82 are rotated and will be operated at an increased ratio, relatively thereto, due to the fact that its driving gear 119 is smaller than the gear 105 by which it is driven, so that the blades 131 will exert a pressure at all times opposite to that exerted by the vanes 82 to equalize the effect of the vane or vanes 82 which are advancing relatively to an oncoming airstream. The rotor blades 131 are disposed in a plane substantially in alignment with the longitudinal axis of the fuselage so that when swung to the right or left of an intermediate position, the air pressure on the blades 131 is increased producing right or left movement of the airplane and further increasing or diminishing the counteracting effect of the blades 131 to the torque of the vanes 82. The torque is increased on the blades 131 as the angle of incidence is increased on vanes 82 by thus swinging the blades 131 to the right or to the left.

Assuming that the aircraft 10 is in flight and that the rotor 82 is operating to exert a lifting force on the aircraft, after the desired altitude has been obtained or after a landing has been accomplished, the horizontal rotor may be moved to an inoperative, folded position in the rear part of the fuselage 11, as illustrated in dotted lines in Figure 2, so that if the craft is airborne, it may be propelled by the propeller 16 and supported solely by the wing 12. To accomplish the folding of the horizontal rotor, pressure on the foot pedal 101 is released and the clutch element 91 is moved out of engagement with the clutch element 87 to disengage the shaft 90 from the shaft 15, after which the brake 107, 108 is applied to brake the rotational speed of the shaft 78 and to stop said shaft with the vanes 82 disposed longitudinally of the fuselage 11. With the horizontal rotor in this position, the detent 73 is released, as previously described, from the toothed segment 76 and the crank 41 is revolved in a direction for turning the worm gear 42 and shaft 33 in a counter-clockwise direction, as seen in Figures 2 and 3. This will cause the standard 43 to swing downwardly and rearwardly, carrying the bearing 53 therewith, which in turn swings the legs 45 and 46 downwardly until the parts assume their folded positions of Figures 2 and 3, as seen in dotted lines, in which the vanes 82 are disposed in the opening 27 of the fuselage and with the remaining parts contained therebeneath and within the fuselage 11. As the parts swing downwardly, the bearing 53 maintains its perpendicular position, so that the rod 56 can telescope into the tubular standard 43. As the standard 43 swings downwardly and rearwardly, its lug 63 swings in the same direction to exert a pull on the connecting rod 62 to cause the lever 68 to swing rearwardly.

The horizontal rotor 82 may also be moved from an inoperative to an operative position, while on the ground or airborne by rotating the crank 41 in the opposite direction to return the parts to their full line positions of Figures 2 and 3. After this has been accomplished, a forward pressure is exerted on the pedal 101 to engage the clutch elements 91 and 87 for driving the shafts 90, 104 and 78 as well as the shafts 120 and 122. The latch 73, 76 of the lever 68 in addition to functioning for maintaining the parts in their operative positions, also enables the horizontal rotor to be maintained in a forwardly and downwardly tilted position. This is accomplished, after the parts have been moved to their operative positions by exerting a forward pressure on the lever 68 which thereby exerts a pull on the rod 56 through the rods or links 59 and 62 to cause the bearing 53 to be rocked slightly in a clockwise direction, as seen in Figures 2 and 3, on the pivot 52 so that the horizontal rotor may be tilted through an arc of four or five degrees, approximately, so that the horizontal rotor will augment the action of the propeller 16 in propelling the aircraft 10 in a forward direction.

Various modifications and changes are contemplated and may obviously be resorted to, without departing from the spirit and scope of the invention as hereinafter defined by the appended claims.

I claim:

1. An aircraft comprising a fuselage, a horizontal rotor disposed above the fuselage, a prime mover in the fuselage, disengageable means driving the rotor from said prime mover, manually actuated means for moving the rotor to a retracted position within the fuselage, said manually actuated means including a bearing frame disposed within the fuselage, a rotor shaft bearing, brace members swingably supported on the bearing frame and pivotally connected to the rotor shaft bearing, and manually actuated means for oscillating the brace members for raising and lowering the rotor shaft bearing and the horizontal rotor carried thereby.

2. An aircraft comprising a fuselage, a horizontal rotor disposed above the fuselage, a prime mover in the fuselage, disengageable means driving the rotor from said prime mover, manually actuated means for moving the rotor to a retracted position within the fuselage, said manually actuated means including a bearing frame disposed within the fuselage, a rotor shaft bearing, brace members swingably supported on the bearing frame and pivotally connected to the rotor shaft bearing, manually actuated means for oscillating the brace members for raising and lowering the rotor shaft bearing and the horizontal rotor carried thereby, and link and lever means connected to the brace members for tilting the rotor.

3. In an aircraft, in combination with an airplane including a fuselage, a wing, a propeller, a prime mover for the propeller and a rudder; a horizontal rotor disposed above the fuselage and including a perpendicular rotor shaft and a bearing for journaling said shaft, driving means including a clutch and flexible shaft for connecting the rotor shaft to the prime mover, a supporting frame fixedly disposed in the fuselage, a plurality of braces pivotally connected to the supporting frame and to the bearing of the rotor shaft, manually actuated means for oscillating said braces for retracting the rotor into the fuselage, said braces supporting the rotor shaft in a position substantially perpendicular to the axis of the fuselage when the rotor is in an extended or a retracted position, and manually controlled means for tilting the rotor in a raised, operative position.

4. An aircraft as in claim 3, said last mentioned means including link and lever means connected to one of the braces and independently operable for tilting said rotor while in an operative position.

5. An aircraft as in claim 3, a vertical tail fin on which said rudder is pivotally mounted, said tail fin and rudder being recessed to form an opening, a torque control rotor rotatably mounted in the opening of the tail fin and rudder and disposed in a plane substantially coincident therewith, and means including a flexible shaft for driving said torque control rotor from the shaft of the horizontal rotor.

6. An aircraft as in claim 3, a vertical tail fin on which said rudder is pivotally mounted, said tail fin and rudder being recessed to form an opening, a torque control rotor rotatably mounted in the opening of the tail fin and rudder and disposed in a plane substantially coincident therewith, means including a flexible shaft for driving said torque control rotor from the shaft of the horizontal rotor, said torque control rotor being rotatably supported on the rudder for swinging movement therewith.

7. An aircraft as in claim 3, said fuselage being provided with an opening in the top thereof through which the rotor and its supporting parts are movable, said rotor including a pair of diametrically opposed vanes disposed in and substantially closing the fuselage opening when the parts are in folded position.

8. An aircraft as in claim 3, one of said braces being formed of telescopic sections, and link and lever means connected to a section of said brace, connected to the rotor bearing, for tilting the rotor when in an operative position.

9. An aircraft as in claim 3, a vertical tail fin on which said rudder is pivotally mounted, and a torque control rotor mounted in the rudder and tail fin and swingably supported by the rudder, and power take-off means including a flexible shaft and meshing bevel gears connecting the torque control rotor to the rotor shaft of the horizontal rotor.

HARLEY ALLEN GARRETT.

REFERENCES CITED

The following references are of record in the file of this patent:

UNITED STATES PATENTS

| Number | Name | Date |
|---|---|---|
| 1,715,303 | Norton | May 28, 1929 |
| 1,861,336 | Cox | May 31, 1932 |
| 1,982,968 | Stalker | Dec. 4, 1934 |
| 2,135,073 | Gerhardt et al. | Nov. 1, 1938 |
| 2,330,803 | Andrews | Oct. 5, 1943 |
| 2,380,580 | Cierva | July 31, 1945 |
| 2,395,143 | Prewitt | Feb. 19, 1946 |
| 2,464,285 | Andrews | Mar. 15, 1949 |

FOREIGN PATENTS

| Number | Country | Date |
|---|---|---|
| 409,193 | France | Feb. 12, 1910 |